United States Patent [11] 3,563,152

| [72] | Inventor | Lawrence M. Douglas |
| | | Brockton, Mass. |
| [21] | Appl. No. | 741,741 |
| [22] | Filed | July 1, 1968 |
| [45] | Patented | Feb. 16, 1971 |
| [73] | Assignee | Polaroid Corporation |
| | | Cambridge, Mass. |
| | | a corporation of Delaware |

[54] EXPOSURE CONTROL APPARATUS
6 Claims, 7 Drawing Figs.

[52] U.S. Cl. .................................................. 95/57
[51] Int. Cl. .................................................. G03b 9/28
[50] Field of Search .......................................... 95/57, 64

[56] References Cited
UNITED STATES PATENTS
2,126,302   8/1938   Young.......................... 95/57
3,348,463  10/1967   Nerwin......................... 95/64

Primary Examiner—John M. Horan
Assistant Examiner—M. L. Gellner
Attorneys—Brown and Mikulka, William D. Roberson and James L. Neal ABSTRACT: An exposure control apparatus for a photographic camera incorporating a shutter blade formed from planar resilient spring material. The shutter material is formed to assume a spiral orientation when relaxed and is drawn from this orientation when cocked to assume a spring loaded condition. Release of the blade from this spring loaded orientation permits its exposure influencing movement about an exposure aperture.

PATENTED FEB 16 1971

INVENTOR.
Lawrence M. Douglas

BY Brown and Mikulka
and
James L. Neal
ATTORNEYS

PATENTED FEB 16 1971 3,563,152

INVENTOR.
Lawrence M. Douglas
BY
Brown and Mikulka
and
James L. Neal
ATTORNEYS

EXPOSURE CONTROL APPARATUS

BRIEF DESCRIPTION OF THE INVENTION

This invention contemplates an exposure control mechanism for a photographic camera which utilizes a leaf spring of resilient sheet material for each shutter blade. The spring tends to assume a relaxed condition and may be drawn from the relaxed condition to a tension condition for exposure producing movement relative to an exposure aperture.

Since the shutter blade itself is a spring, the mechanism does not need an independent shutter drive means. This simplifies the apparatus while affording a high degrees of accuracy.

The manner in which accuracy is facilitated and certain other advantages may be understood in connection with the following description of the preferred embodiment. Each shutter blade comprises a resilient leaf spring which in its relaxed condition is wound into a tight spiral around a cylindrical support. A portion of the spring is withdrawn from its relaxed condition upon the cylindrical support across the exposure aperture to a second cylindrical support having a larger diameter than the first. The spring normally blocks the passage of light through the exposure aperture, but an opening is formed therein so that a predetermined movement of the spring will cause the opening to be in alignment with the exposure aperture for unblocking the aperture to permit the passage of light therethrough.

The spring tends to wind upon the first and smallest cylindrical support. However, when the shutter is cocked, a major portion of the spring is drawn to the larger support from the smaller one and is releasably retained thereon. The portion of the spring between the two supports is substantially planar. During exposure producing operation, the spring is released and it winds upon the smaller cylindrical support in accordance with its inherent bias. In so doing, exposure influencing movement of the spring relative to the exposure aperture takes place.

The zone of the spring which provides the winding force is the zone of transition between the planar configuration and the relaxed spiral condition. The planar portion of the spring between the supports is unable to assume a relaxed spiral condition by virtue of its being drawn between the supports. Thus, the first opportunity to relax occurs at the zone immediately adjacent the small cylindrical support. As successive portions of the spring move to this zone, relaxation of these portions occurs. As the spring relaxes, it winds itself upon the support, and in so doing, it causes the support to turn. Thus, successive portions of the spring approaching the transition zone exert a driving force (e.g., winding force) upon the spring and in so doing, advance to permit another portion of the spring to move to the transition zone and likewise exert a driving force upon the spring. Since successive, limited portions of the spring act as a continuous drive means, the spring does not unwind as the driving action takes place. The result is a substantially constant driving force.

It is an object of this invention to provide simplified exposure control apparatus for a photographic camera wherein each shutter blade comprises resilient sheet material for exposure influencing movement between relaxed and tensioned conditions.

It is also an object of this invention to provide exposure control apparatus for a photographic camera wherein a resilient leaf spring constitutes each shutter blade and defines a substantially constant shutter blade driving force.

Other objects of the invention will in part be obvious and will in part appear hereinafter.

DETAILED DESCRIPTION OF THE DRAWINGS

Figure 1:
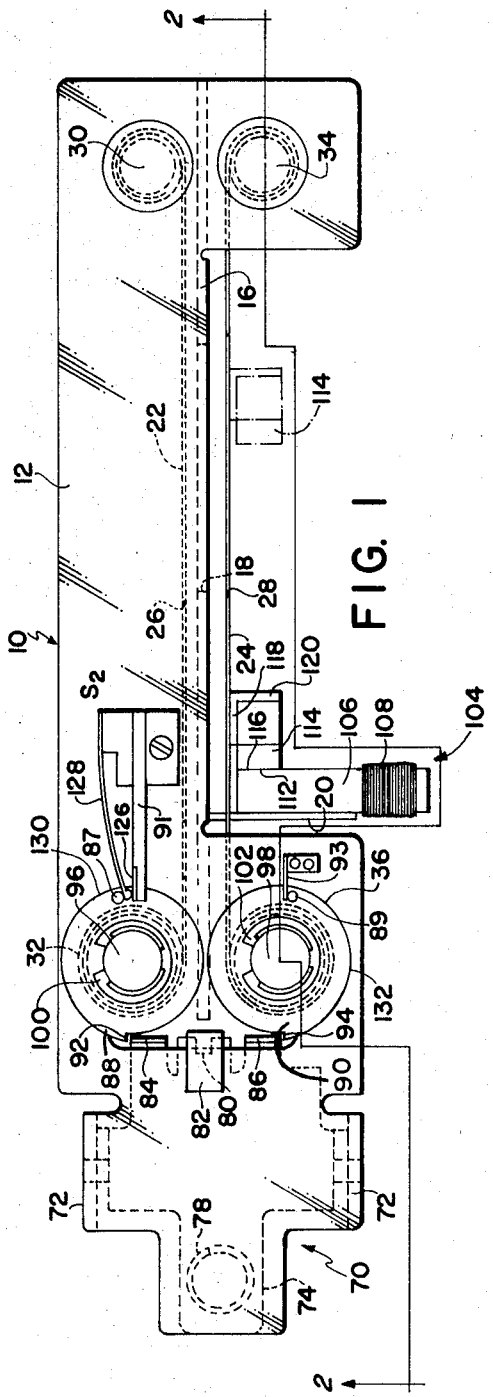
FIG. 1 is a side elevational view of a preferred embodiment of this invention.

A preferred embodiment of the invention will now be described in detail in connection with FIGS. 1 through 4.

The apparatus is supported by frame 10. The frame includes parallel side portions 12 and 14, central portion 16 spatially separating and connecting side portions 12 and 14 and exposure aperture 18 formed along an optical axis by central portion 16. Plate 20 extends downwardly from central portion 16.

Shutter blades 22 and 24 are disposed upon opposite sides of central portion 16 for exposure influencing movement relative to exposure aperture 18. Each of the shutter blades is formed by spring means comprising opaque resilient sheet material which assumes a spirally wound configuration in its relaxed condition and is capable of being drawn from its relaxed condition into an energy-storing tensioned condition wherein it is characterized by a planar configuration. Blade 22 forms aperture 26 and blade 24 forms aperture 28.

Each shutter blade is supported by a pair of cylindrical supports, which serve as spools upon which the shutter blades are wound. One of the cylindrical supports for each shutter blade is smaller than the other cylindrical support for the same shutter blade. The end of each sheet of resilient material adjacent its spiral axis is attached to a relatively small cylindrical support so that the inherent tendency of the spring to assume a tightly wound configuration causes it to wind itself upon the relatively small cylindrical support when it is permitted to relax. The other end of each sheet of resilient material is attached to one of the relatively large supports. The attachments may be by any convenient means, such as by riveting. The radius of the relatively large cylindrical support for each shutter blade should be larger than the radius of the small cylindrical support by an amount which enables the smallest radius attained by the large support together with the least amount of sheet material wound thereon to be larger than the largest radius attained by the small cylindrical support together with the greatest amount of sheet material wound thereon. Resilient sheet material 22 is supported by a support means comprising relatively small cylindrical support 30 and relatively large cylindrical support 32. Resilient sheet material 24 is supported by support means including relatively small cylindrical support 34 and relatively large cylindrical support 36. Supports 30 and 32 are rotatably mounted between parallel side portions 12 and 14 of frame 10 and on the same side of central portion 16. Cylindrical support 30 is mounted adjacent one end of frame 10 and cylindrical support 32 is located adjacent the opposite end of frame 10 so that exposure aperture 18 is located between them. Supports 34 and 36 are similarly rotatably mounted between side portions 12 and 14 and on the side of central portion 16 opposite the side adjacent which supports 30 and 32 are mounted. Aperture 18 is located between supports 34 and 36. The ends of shutter blades 22 and 24 adjacent their spiral axes are fixedly attached to cylindrical supports 30 and 34, respectively, while the other ends of the aforesaid shutter blades are rigidly attached to cylindrical supports 32 and 36, respectively. In this manner, a portion of each of the shutter blades always assumes a substantially planar configuration between its respective supports, across exposure aperture 18, and is continuously biased for movement from its larger supporting member to a relaxed condition wherein it is wound upon its relatively small cylindrical support member.

Shutter blade 22 will be designated as a light unblocking blade and shutter blade 24 will be designated a light blocking shutter blade. These characterizations relate to their function during exposure-producing operation of the apparatus. When the exposure control apparatus is in a cocked condition, both of the shutter blades, 22 and 24, are wound upon their respective relatively large cylindrical supports 32 and 36, and, in accordance with their inherent tendency to achieve their relaxed conditions, are biased for movement past the exposure aperture and into a spiral condition upon relatively small supports 30 and 34. When the shutter blades are cocked, exposure aperture 28 of blocking blade 24 is in superposition with exposure aperture 18 and an opaque portion of opening blade 22 blocks the exposure aperture to prevent the passage of light therethrough, aperture 26 being located to the left of exposure aperture. During exposure-producing operation which will subsequently be described in detail, shutter blades 22 and 24 are permitted to move sequentially to their relaxed conditions. Blade 22 is permitted to move relative to the exposure aperture to advance aperture 26 into superposition with the exposure aperture; aperture 28 in light blocking blade 24 has been brought into superposition with the exposure aperture during cocking operation. The three apertures are thus aligned along the optical axis to permit light to pass. Subsequently, blade 24 is permitted to relax and move from its larger support to its smaller support. In this manner, aperture 28 moves out of superposition with exposure aperture 18 and an opaque portion of shutter blade 24 moves into light blocking position relative to the exposure aperture.

Figure 4:
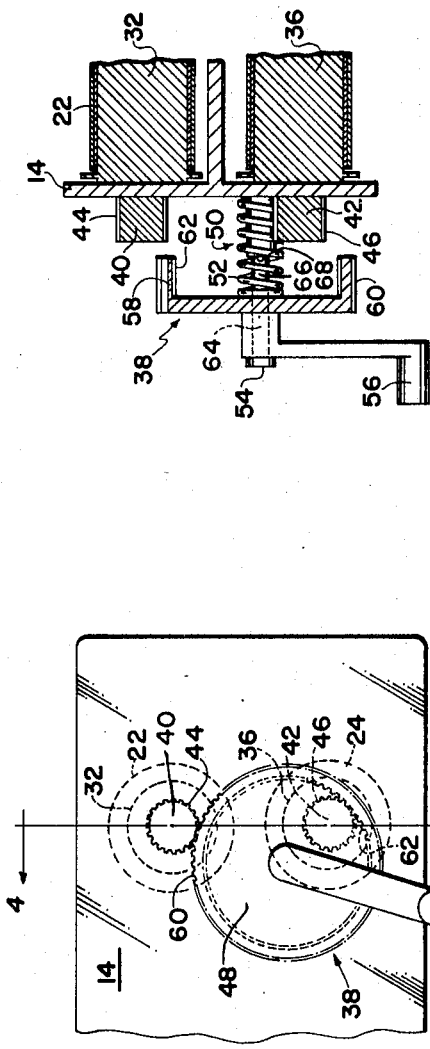
FIG. 4 is a sectional view of FIG. 3 taken along line 4—4.
Figure 3:
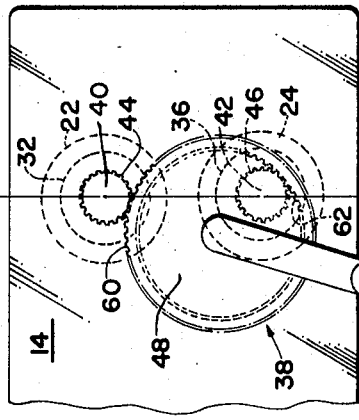
FIG. 3 is a fragmentary elevational view of the side of the apparatus opposite that shown in FIG. 1.

Cocking means 38, shown in FIGS. 3 and 4, is provided for drawing the shutter blades from their relaxed position upon the relatively small cylindrical supports to their relatively large cylindrical supports. All of the cylindrical supports mentioned above include journal means 39 which cooperate with side portions 12 and 14 for holding them in position. Extensions 40 and 42 extend beyond journals 39 from one end of relatively large cylindrical supports 32 and 36, respectively. Extension 40 defines gear 44 and extension 42 defines gear 46. Structure 48 is mounted for rotation upon support 50 and biased by spring 52 against enlarged end 54 of the support. Structure 48 includes handle 56 formed integrally with gear means 58. Gear means 58 forms gear 60 on an outer periphery thereof and gear 62 on an inner periphery thereof. Gears 60 and 62 are located for selective cooperation with gears 44 and 46, respectively.

Support 50 is characterized by a relatively large base portion 64 and a relatively small portion 66 which forms shoulder 68. Structure 48 is movable between shoulder 68 and enlarged portion 54 and, as aforesaid, is biased against enlarged end 54. When structure 48 is positioned adjacent enlarged end 54, gears 60 and 62 are disengaged from gears 44 and 46. In this condition, there is no engagement between supports 32 and 36 and each is free to move independently of the other. This freedom enables exposure-producing operation to take place in the manner hereafter to be described. Subsequent to exposure, both shutter blades are wound upon their respective small cylindrical supports 30 and 34. Cocking operation which winds the shutter blades back on the relatively large supports is effected by manually engaging handle 56, moving structure 48 along the longitudinal axis of portion 66 of support 50 against the bias of spring 52 to bring gear 60 into operative engagement with gear 44 and to bring gear 62 into operative engagement with gear 46 and then rotating structure 48 by means of handle 56. Clockwise rotation of structure 48 (as viewed in FIG. 3) imparts counterclockwise rotation to support 32 and clockwise rotation to support 36. In this manner, supports 36 and 32 wind blades 24 and 22, respectively upon them. When cocking operation is complete, supports 32 and 36 are engaged by an actuating and retaining means hereafter described and releasably held against clockwise and counterclockwise movement respectively. Structure 48 is then released to permit spring 52 to return the structure to its position against enlarged end 54, thus disengaging gears 60 and 62 from gears 44 and 46. In the cocked condition, an opaque portion of opening blade 22 blocks the passage of light through exposure aperture 18, along the optical axis, and aperture 26 therein is positioned to the left of the exposure aperture, as viewed in FIG. 2.

Closing blade 24 is positioned such that aperture 28 therein is located along the optical axis in superposition with the exposure aperture.

Actuating and retaining means 70 will now be described. Side portion 12 of frame 10 includes a pair of bent tabs 72 for pivotally supporting member 74. As viewed in FIG. 2, member 74 is biased for counterclockwise movement about pivotal support means 76 by spring means 78. Projection 80 on member 74 abuts side portion 12 to limit the counterclockwise movement. Member 74 includes a manually engageable actuating portion 82 and a pair of like latching projections 84 and 86. Latching projections 84 and 86, in cooperation with engageable cam members 88 and 90, releasably hold supports 32 and 36 in the cocked position. Engageable cam members 88 and 90 include, respectively, offsets 92 and 94 which are engaged by latching members 84 and 86 respectively, pins 87 and 89 for cooperation with projecting members 91 and 93 and cam surfaces 130 and 132. The engageable cam members are retained on extensions 96 and 98 of supports 32 and 36 respectively by means of clamping means 100 and 102.

Engageable cam members 88 and 90 are also provided with means for terminating their rotation after substantially one revolution. The diameters of relatively large cylindrical supports 32 and 36 bear such relationship to the linear extent of exposure aperture 18 in the direction of shutter blade movement that substantially one revolution of cylindrical supports 32 and 36 will result in movement of apertures 26 and 28 in shutter blades 22 and 24 respectively entirely into and out of unblocking relationship with exposure aperture 18.

The stop means for cylindrical support 36 comprises pin 89 mounted on engageable cam member 90 for cooperation with projecting member 93 affixed to side portion 12. The stop means for cylindrical support 32 includes pin 87 mounted upon engageable cam member 88 and projecting member 91 positioned for cooperation with pin 87. Pin 87 and projecting member 91 also cooperate with terminals 126 and 128 of switch $S_2$ in a manner hereafter described. Engageable cam members 88 and 90 are so mounted upon extensions 96 and 98 that relative rotation between the extensions and the cam members is prohibited Thus, when the apparatus is cocked and the cam members are released for rotation by latching members 84 and 86, pins 87 and 89 will move from a position adjacent one side of projecting members 91 and 93 respectively, travel circularly almost 360° and then contact the opposite sides of projecting members 91 and 93 respectively to terminate rotation. In this manner, movement of the resilient sheet material forming opening and closing blades 22 and 24 is terminated without necessarily winding all of the sheet material from cylindrical supports 32 and 36.

Retaining and actuating means 70 also includes an electromechanical retaining means designated 104 for releasably holding closing blade 24 in its aperture unblocking position wherein it is wound upon relatively large cylindrical support 36 after release of blades 22 and 24 by retaining and actuating means 70. Retaining means 104 may involve an electromagnet including U-shaped core 106 having electrically energizable coil 108 wound around a leg thereof. Coil 108 is included in electrical timing circuit means 110 which is a control circuit for influencing the duration of the exposure interval. The control circuit includes switches $S_1$ and $S_2$ and is adapted to energize electromechanical retaining means 104 when switch $S_1$ is operated and subsequently deenergize the retaining means a predetermined interval after switch $S_2$ is operated.

One example of circuit means 110 suitable for use with the exposure control apparatus of this invention is shown and fully described in U.S. Pat. No. 3,241,471, issued to John P. Burgarella on Mar. 22, 1966.

Faces 112 of core 106 are coplanar and cooperable with magnetizable keeper 114 mounted upon closing blade 24. Core 106 is supported by plate 20 and positioned adjacent cylindrical support 36 of closing blade 24 for cooperation with the keeper when the closing blade is in the aforesaid aperture unblocking position. The core and the keeper are so arranged that face 116 of the keeper contacts faces 112 of the core to define a magnetic circuit when coil 108 is energized. Energization of coil 108 supplies a sufficient magnetomotive force to hold the keeper against the core and thus retain the closing blade in its aperture unblocking position in opposition to its tendency to wind itself upon support 34 wherein it assumes its aperture blocking position.

Magnetizable keeper 114 is mounted upon closing blade 24 by mounting means 118. Mounting means 118 includes resilient supporting members 120 which are flexed to press the keeper firm against the core when the apparatus is cocked. This is achieved by constructing the apparatus so that, during cocking operation the keeper is brought into contact with the core briefly before advancement of closing blade 24 from relatively small cylindrical support 32 to relatively large cylindrical support 36 is terminated. The overtraveling movement of blade 24 which occurs after contact between the keeper and the core serves to flex members 120 which in turn press the keeper firmly against the core.

Mounting of switches $S_1$ and $S_2$ for control circuit 110 will now be described.

Switch $S_1$ is mounted adjacent member 74 of actuating and retaining means 70 for operation in response to movement of member 74. Switch $S_1$ includes terminal 122 and resilient terminal 124. Resilient terminal 124 is biased out of contact with terminal 122 and is engageable by a portion of member 74. When member 74 is rotated clockwise, it flexes terminal 124 into engagement with terminal 122 to close switch $S_1$.

Switch $S_2$ is mounted for operation in response to movement of opening blade 22. Terminal 126 is mounted on the surface of projecting member 91 for cooperation with resilient terminal 128. Terminal 128 is biased out of contact with terminal 126 and adapted to be moved into contact therewith by pin 87 when the apparatus is cocked and engageable cam member 88 is engaged by latching member 84.

Operation of the apparatus will now be described.

Figure 2:
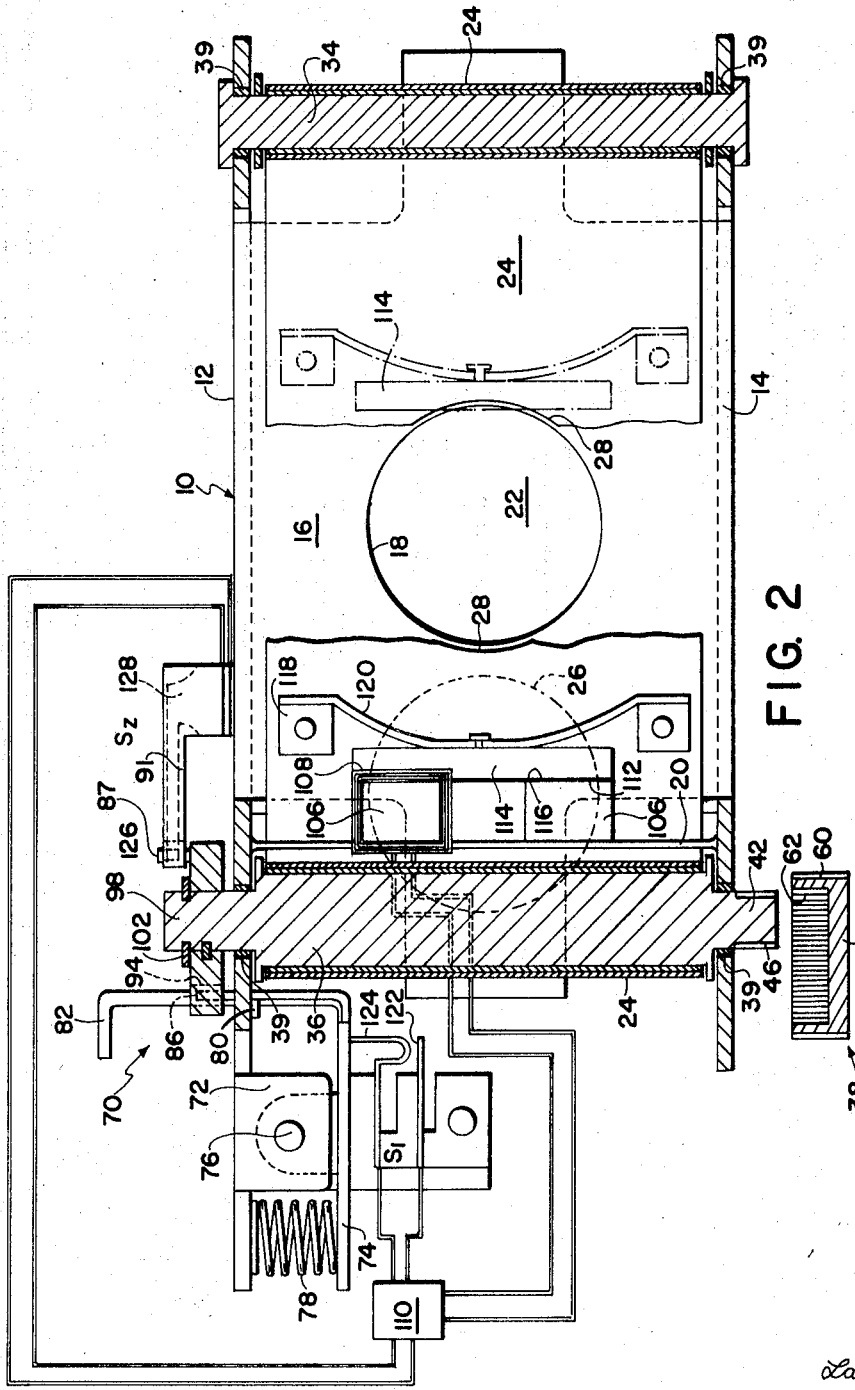
FIG. 2 is a plan view of the apparatus of FIG. 1 taken along line 2—2.

When the apparatus is cocked, as shown in FIGS. 1 and 2, opening blade 22 is wound upon elongated support 32; offset 92 of engageable cam member 88 is held by latching member 84. The portion of opening blade 22 forming aperture 26 is located between exposure aperture 18 and cylindrical support 32. An opaque portion of opening blade 22 covers exposure aperture 18 to block the passage of light therethrough. Closing blade 24 is wound upon cylindrical support 36 and offset 94 of engageable cam member 90 is retained by latching member 86. The portion of closing blade 24 forming aperture 28 is positioned so that aperture 28 is superpositioned with exposure aperture 18, thereby unblocking the exposure aperture. Since opening blade 22 and closing blade 24 each possess inherent resiliency which biases them into the aforesaid spirally wound condition upon relatively small cylindrical supports 30 and 34, they are initially held in the cocked position only by the engagement between latching member 84 and offset 92 and the engagement between latching member 86 and offset 94.

To initiate exposure-producing operation, actuating projection 82 is manually engaged to move member 74 about pivotal support means 76. This moves terminal 124 into contact with terminal 122 to close switch $S_1$ and subsequently, moves latching members 84 and 86 out of engagement with offsets 92 and 94, respectively. Closure of switch $S_1$ energizes electrical timing circuit means 110 and coil 108 therein. Energization of the coil produces the aforesaid magnetic circuit in core 106 and keeper 114 for holding the keeper against the core to prevent movement of closing blade 24 which would otherwise occur in response to the subsequent disengagement of offset 94 by latching means 86. Offsets 92 and 94 are simultaneously disengaged by latching members 84 and 86 after closure of switch $S_1$. The resilient sheet means forming opening blade 22 is permitted to wind itself upon cylindrical support 30. In response to initial movement of opening blade 22, pin 87 moves away from projecting member 91 and resilient terminal 128 of switch $S_2$. This permits terminal 128 to move out of contact with terminal 126 to open switch $S_2$. The opening of switch $S_2$ initiates the timing operation of electrical timing circuit means 110. Opening blade 22 continues to wind itself upon cylindrical support 30 until substantially one revolution of cylindrical support 32 and engageable cam member 88 has been produced. Movement of opening blade 22 is terminated when pin 87 abuts projecting member 91 on the side thereof opposite the side from which its movement began. At this time, aperture 26 formed by opening blade 22 is brought into light-unblocking relationship with exposure aperture 18 to initiate the exposure interval.

The timing operation of circuit means 110 initiated by movement of opening blade 22 is completed a controlled timed interval after initiation thereof. Completion of the timing operation deenergizes coil 108 to terminate the magnetic holding force between core 106 and keeper 114. The resilient sheet material forming closing blade 24 is then free to wind itself upon relatively small cylindrical support 34. This movement continues until substantially one revolution of cylindrical support 36 and engageable cam member 90 has been produced. Pin 89 will move away from one side of projecting member 93, move through substantially one revolution and then abut the opposite side of projecting member 93 to terminate movement of closing blade 24, cylindrical support 36 and the attached engageable member 90. When movement is terminated, aperture 28 formed by closing blade 24 has moved out of light-unblocking relationship with exposure aperture 18 and an opaque portion of closing blade 24 is brought into light-unblocking relationship with the exposure aperture to terminate the exposure interval. The position of keeper 114 after termination of exposure is shown in phantom lines in FIG. 1.

Member 74 must be maintained in its clockwise rotated position during exposure production to maintain switch $S_1$ in a closed condition and to avoid possible interference between the latching members and the engageable cam members. However, human reaction time in depressing and releasing actuating projection 82 substantially exceeds the longest exposure likely to be produced under normally "snap shot" conditions. Switch $S_1$ will thus be closed at least as long as the correct exposure time and will be released only after both blades 22 and 24 have wound themselves upon their respective relatively small cylindrical supports 30 and 34. Upon release of actuating projection 82, spring 78 expands to return member 74 to its rest position wherein latching members 84 and 86 are returned to their positions for engaging offsets 92 and 94 respectively and switch $S_1$ is permitted to open.

Prior to subsequent exposure production, shutter blades 22 and 24 must be reset in accordance with cocking operation previously described. Cocking operation is terminated in a positive manner by engagement of projecting member 93 by pin 89 and by movement of pin 87 into a position wherein it engages resilient terminal 128 of switch $S_2$, and deflects it into contact with terminal 126 mounted in rigid projecting member 91, projecting member 91 supplying the necessary abutment for terminating the movement of pin 87. As cocking motion takes place, cam surfaces 130 and 132 of engageable cam members 88 and 90 press against latching members 84 and 86 respectively and deflect these latching members by a sufficient amount to permit offsets 92 and 94 to move past them. When offsets 92 and 94 move past latching members 84 and 86, the latching members are free to return to a relaxed position wherein they are located in the path of the offsets to hold relatively large cylindrical supports 32 and 36 against rotation. The apparatus is thus maintained in cocked condition, ready for further exposure-producing operation.

Certain winding and unwinding characteristics of the shutter blades of this invention will now be discussed in connection with FIGS. 5a, 5b and 5c. This discussion is primarily to illustrate how the resilient sheet material forming a shutter blade acts when wound in various configurations.

The sheet material forming a leaf spring which acts as a shutter blade is inherently biased for winding itself into a tight spiral and must be drawn from this tight spiral for exposure-influencing movement. The material attains a planar configuration when drawn from the spiral. In any given condition, the material which remains wound in the tight spiral into which it is biased, is inactive. It has attained its maximum relaxation. The end of the material which is drawn from the tight spiral tends also to wind upon itself in accordance with the bias. The substantially planar portion of the sheet material between the tight spiral and the means pulling the sheet material from the spiral is prevented from winding by virtue of its retention between these opposing forces. The zone of the spring which supplies the winding forces is the zone of transition between the portion of the spring characterized by a substantially planar configuration and a portion or portions of the spring wound into a spiral.

Figures 5A, 5B, 5C:
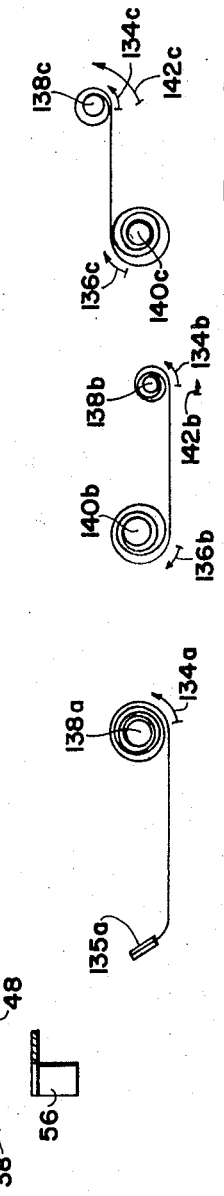
FIGS. 5a through 5c are schematic views of shutter blade configurations usable in conjunction with the apparatus shown in FIGS. 1 through 3.

One example of this is illustrated in FIG. 5a. Material wound upon support 138a is drawn from its spiral configuration for exposure-influencing operation and tends to rewind itself upon the support by the action of the transition zone designated by directional arrow 134a. The end of the material being drawn from support 138a tends to wind upon itself but is prevented from doing so by an appropriate means, for example, means 135a for drawing the material from support 138a.

FIG. 5b illustrates the configuration described in connection with FIGS. 1 and 2. Sheet material forming the shutter blade is drawn from relatively small support 138b onto relatively large support 140b. Due to the inherent bias of the resilient sheet material, one end tends to wind itself upon support 140b and the other end tends to remain wound upon support 138b. Since support 138b is smaller than 140b, the tendency for the resilient sheet material to wind itself upon support 138b is greater than its tendency to wind itself upon support 140b. There is thus a resulting bias for movement from the large support to the small one.

In the configuration of FIG. 5b transition zone designated by arrow 134b and transition zone designated by arrow 136b act in opposite directions. The resulting force indicated by arrow 142b tends to wind the spring upon relatively small support 138b. The subtraction of forces resulting from this spring winding configuration yields a smaller shutter driving force than that which the spring is inherently capable of producing. In many applications, this reduced driving force is desirable. For example, if the required shutter speed is attainable by this configuration, the result will be a camera characterized by a minimum of vibration resulting from mechanical impact which also requires a relatively small cocking force.

Reference is now made to FIG. 5c wherein the resilient sheet material is drawn from relatively small support 138c onto relatively large support 136c. In this instance, however, the winding upon support 140c is in a direction opposite to the inherent bias of the resilient sheet material. Transition zones designated by directional arrows 134c and 136c are produced; the former tending to wind the spring into a tight spiral upon support 138c and the latter tending to wind the spring from support 140c. Accordingly, the forces add and the result is a relatively large shutter-driving force designated by arrow 142c. This configuration gives a maximum driving force for a maximum shutter speed from any given sheet of resilient material.

According to the foregoing, it can be appreciated that this invention provides shutter blades facilitating a simplified exposure control apparatus for a photographic camera wherein the shutter blades comprise resilient leaf springs driven by a winding force developed from within the spring itself.

The terms "clockwise," "counterclockwise," "right," "left," "up," "down" and the like are used in the foregoing disclosure to describe movement of various elements as seen in the FIGS. and are not intended to be used in a limiting sense.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Exposure control apparatus for a photographic camera having an exposure aperture, said apparatus comprising:
   a. resilient sheet material forming at least one shutter blade, having a spirally configures configured relaxed condition and extendable therefrom into an energy storing flexed condition, said sheet material being located for exposure influencing movement relative to said aperture during movement from said flexed condition into said relaxed condition; and
   b. means for moving said sheet material from said relaxed condition to said flexed condition and then releasing said sheet material for exposure influencing movement back to said relaxed condition.

2. Exposure control apparatus for a photographic camera having an exposure aperture, said apparatus comprising:
   a. spring means forming at least one shutter blade movable relative to said exposure aperture between flexed and relaxed conditions for influencing photographic exposure during movement from said flexed condition to said relaxed condition;
   b. support means including first and second means positioned on opposite sides of said aperture, said first means supporting one portion of said spring means and said second means supporting another portion of said spring means so that said spring means is located for aperture blocking and unblocking movement across said aperture;
   c. cocking means for flexing said spring means; and
   d. actuating and retaining means for releasably retaining said spring means in said flexed condition and actuatable for releasing said spring means to permit exposure influencing movement from said flexed condition to said relaxed condition.

3. Exposure control apparatus according to claim 2 wherein said spring means comprises resilient sheet material tightly wound about said first means when said spring means is relaxed and capable of being drawn from said relaxed condition to a flexed condition wherein it is wound upon said second means.

4. Exposure control apparatus for a photographic camera comprising:
   a. means forming an exposure aperture;
   b. a first shutter blade formed by first spring means movable between flexed and relaxed conditions, said first spring means unblocking said exposure aperture in said relaxed condition and blocking said exposure aperture in said flexed condition;
   c. a second shutter blade formed by second spring means movable between flexed and relaxed conditions, said second spring means blocking said exposure aperture in said relaxed condition and unblocking said exposure aperture in said flexed condition;
   d. cocking means for moving each of said spring means from their respective relaxed conditions to their respective flexed conditions;
   e. means for releasably retaining each of said spring means in their respective flexed conditions; and
   f. means for releasing said first spring means to permit aperture unblocking movement thereof toward and to its relaxed condition for initiating an exposure interval and subsequently releasing said second spring means to permit aperture blocking movement thereof toward and to its relaxed condition for terminating said exposure interval.

5. Exposure control apparatus according to claim 5 wherein said first and second spring means are spirally wound in their respective relaxed condition conditions and are drawn from said spirally wound, relaxed condition for exposure influencing movement relative to said aperture.

6. Exposure control apparatus comprising:
   a. means forming an exposure aperture;
   b. a first shutter blade formed by first leaf spring means which is wound into a spiral configuration in its relaxed condition and is capable of being drawn from said relaxed condition for exposure influencing movement relative to said exposure aperture;

c. first relatively small elongated support means attached to one end of said first leaf spring means and serving as a spool for receiving said first leaf spring means when it is in said relaxed condition and wound into said spiral configuration;

d. first relatively large elongated support means attached to the opposite end of said first leaf spring means and serving as a spool for winding said first leaf spring means thereupon while drawing said first leaf spring means from its relaxed condition upon said first relatively small elongated support to position said first leaf spring means for exposure influencing movement relative to said exposure aperture when said first spring means is permitted to relax;

e. a second shutter blade formed by second leaf spring means which is wound into a spiral configuration in its relaxed condition and is capable of being drawn from said relaxed condition for exposure influencing movement relative to said exposure aperture;

f. second relatively small elongated support means attached to one end of said second leaf spring means and serving as a spool for receiving said second leaf spring means when it is in said relaxed condition and wound into said spiral configuration;

g. second relatively large elongated support means attached to the opposite end of said second leaf spring means and serving as a spool for winding said second leaf spring means thereupon while drawing said second leaf spring means from its relaxed condition upon said second relatively small elongated support to position said second leaf spring means for exposure influencing movement relative to said exposure aperture when said first leaf spring means is permitted to relax; and h. means for releasably holding said first and second relatively large support means against rotation after said respective first and second leaf spring means have been wound thereon for releasably retaining said first and second leaf spring means in their respective tensioned positions and for sequentially releasing said first then said second relatively large support means to permit sequential relaxation of said first and then said second leaf spring means.